H. TUECKMANTEL.
BAG FRAME FASTENER.
APPLICATION FILED JULY 28, 1921.

1,408,845.

Patented Mar. 7, 1922.

INVENTOR:
Hugo Tueckmantel,
BY
Fraenkel and Richards,
ATTORNEYS.

H. TUECKMANTEL.
BAG FRAME FASTENER.
APPLICATION FILED JULY 28, 1921.
1,408,845.
Patented Mar. 7, 1922.
3 SHEETS—SHEET 2.
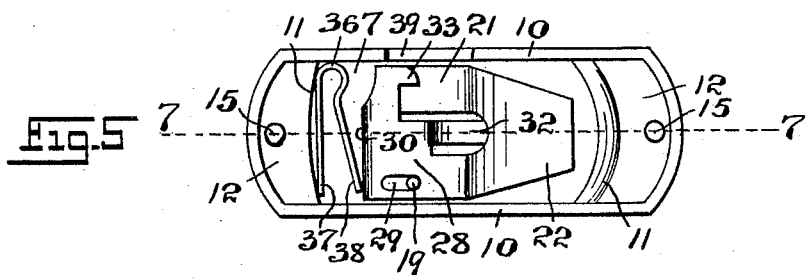
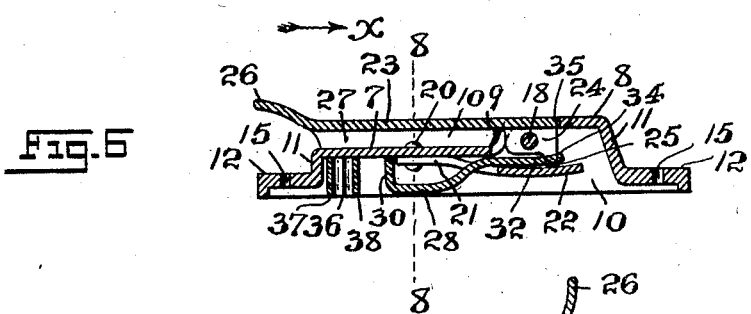
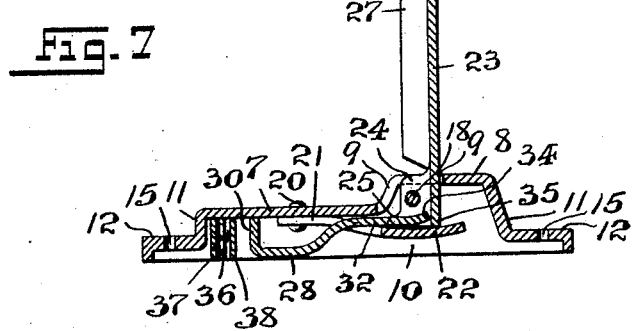
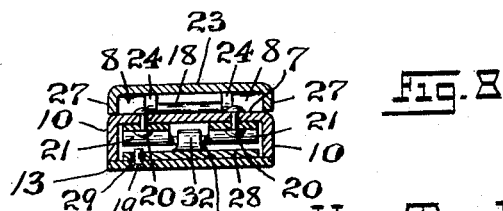
INVENTOR:
Hugo Tueckmantel,
BY Fraentzel and Richards,
ATTORNEYS.

H. TUECKMANTEL.
BAG FRAME FASTENER.
APPLICATION FILED JULY 28, 1921.

1,408,845.

Patented Mar. 7, 1922.
3 SHEETS—SHEET 3.

INVENTOR:
Hugo Tueckmantel,
BY Fraentzel and Richards
ATTORNEYS.

UNITED STATES PATENT OFFICE.

HUGO TUECKMANTEL, OF IRVINGTON, NEW JERSEY, ASSIGNOR TO THE R. NEUMANN HARDWARE CO., A CORPORATION OF NEW JERSEY.

BAG-FRAME FASTENER.

1,408,845.  Specification of Letters Patent.  Patented Mar. 7, 1922.

Application filed July 28, 1921. Serial No. 488,139.

*To all whom it may concern:*

Be it known that I, HUGO TUECKMANTEL, a citizen of the United States, residing at Irvington, in the county of Essex and State of New Jersey, have invented certain new and useful Improvements in Bag-Frame Fasteners; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in bag-frame fasteners; and, the present invention has reference, more particularly, to a novel construction of safety-latch or lock for bag-frames, which is especially adapted for use with the hinged frame-sections of that class of bag-frames known as "English" frames, but which may be readily used with other styles of frames for the various kinds of travelling bags, suit-cases, and the like.

The present invention has for its principal object to provide a simply constructed and positively acting bag-frame fastener, provided with a hinged cover-plate from which the usual frame-section engaging post has been omitted, primarily, to prevent piercing of the frame-sections, the device being provided with a hasp-engaging mechanism, with which the hasp upon the one frame-section can be brought into locked engagement, irrespective of the fact whether the hinged cover-plate is in its opened or closed relation to the mechanism in the fastener-casing to bring and maintain the frame-sections in their closed relation, but acting to retain the said frame-sections in their closed positions, unless the said cover-plate is raised.

The invention has for its further object to provide a novel construction of bag-frame fastener in which the usual side-play between the hinged cover-plate and the box or casing of the fastener, as well as between the hinged-frame sections is positively overcome.

Other objects of the present invention not at this time more particularly enumerated, will be clearly understood from the following detailed description of the same.

With the various objects of the present invention in view, the said invention consists, primarily, in the novel bag-frame fastener hereinafter set forth; and, the said invention consists, furthermore, in the novel arrangements and combinations of the several devices and parts, as well as in the details of the construction of the said parts, all of which will be more fully described in the following specification, and then finally embodied in the clauses of the claims which are appended to and which form an essential part of the said specification.

The invention is illustrated in the accompanying drawings, in which—

Figure 5 is a similar view of the same, however, showing the mechanism within the fastener-casing in its operated position.

Figure 6 is a central longitudinal vertical section of the bag-frame fastener, said section being represented as being taken on line 6—6 in said Figure 4; and Figure 7 is a similar section, said section being represented as being taken on line 7—7 in said Figure 5.

Figure 8 is a transverse vertical section of the bag-frame fastener, said section being taken on line 8—8 in said Figure 6, looking in the direction of the arrow $x$.

Figure 9:
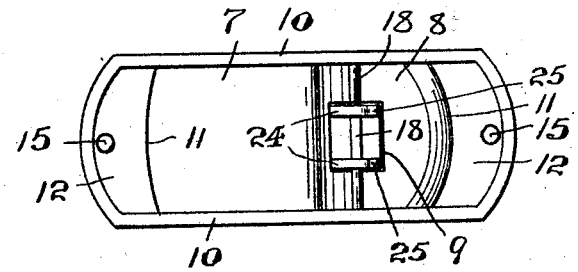
Figure 10:
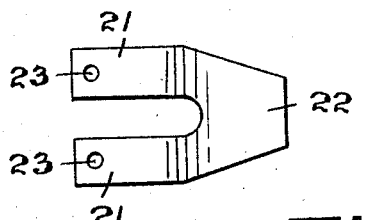
Figure 11:
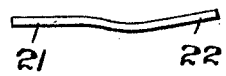
Figure 12:
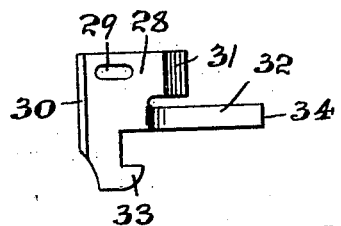
Figure 13:
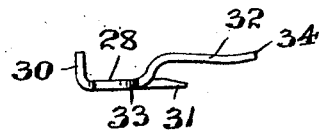

Figure 9 is a bottom view of the fastener-casing, the mechanism within said casing being omitted from said view, said view illustrating more particularly the manner of hinging the cover-plate to said casing; Figures 10 and 11 are a plan view and side elevation of a bifurcated spring-plate used with the fastener-mechanism; and Figures 12 and 13 are a plan view and a side elevation of a hasp-engaging latch-plate or slide also used with the fastener-mechanism.

Figure 14:
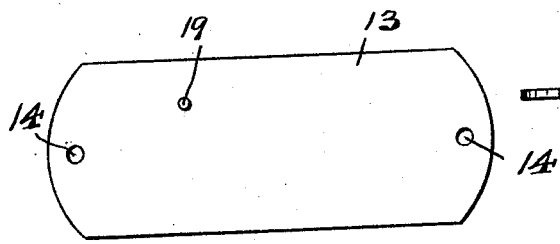
Figure 15:
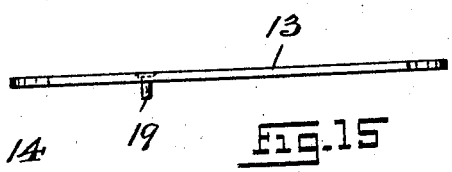

Figure 14 is a plan view of the separable base-plate of the bag-frame fastener; and Figure 15 is a side elevation of the same.

Similar characters of reference are employed in all of the said above described views, to indicate corresponding parts.

Referring now to the figures of the drawings, the reference-character 1 indicates the main member of the outer frame-section, upon the upper face of which is adapted to be secured, in the desired positions, a pair of bag-frame fasteners of the general character and construction to be presently more fully described, and the reference-character 2 indicates the main member of the inner frame-section, to which are secured by means of rivets 3, or other suitable fastening means, hasp-plates, as 4, each hasp-plate having a forwardly extending member 5 formed with a catch or hasp-member, as 6, adapted to be brought into retaining engagement with the mechanism within each fastener casing, in a manner to be presently set forth.

Figure 1:
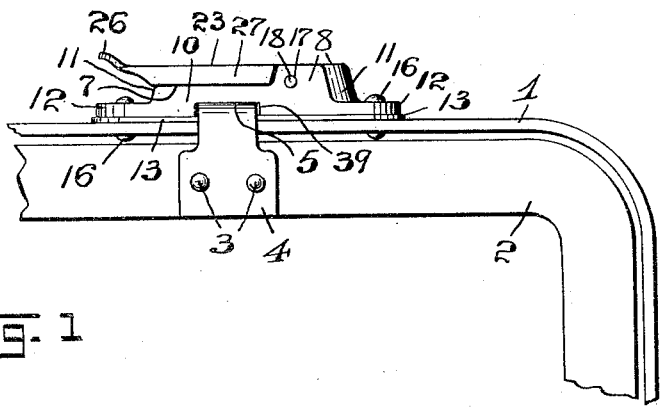
Figure 1 is a front elevation of a fragmentary portion of a bag-frame of the "English" or sewed-in type, provided with a bag-frame fastener, made according to the principles of the present invention.
Figure 2:
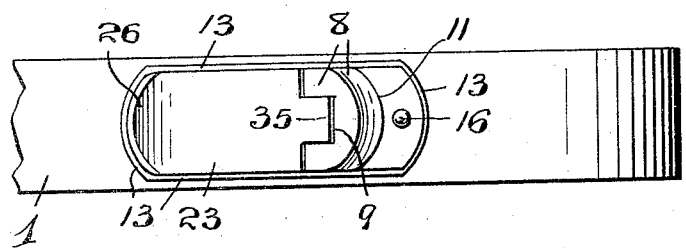
Figure 2 is a top-edge view of the parts illustrated in said Figure 1, the frame-sections and fastener, in both views, being represented in their closed relation.
Figure 3:
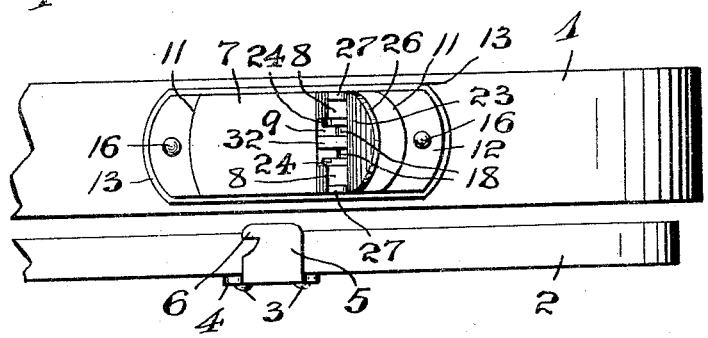
Figure 3 is a top view of the frame-sections and fastener, the frame-sections being represented in an open relation, and the hinged cover-plate of the fastener being shown in its raised position.
Figure 4:
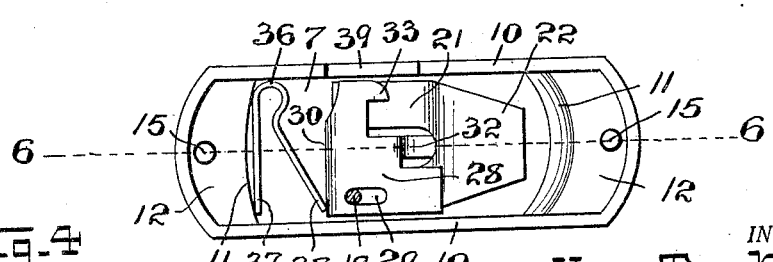
Figure 4 is a bottom view of the bag-frame fastener, with a separable base-plate with which the fastener may be provided, being omitted from said view, said view being made on an enlarged scale.

Each bag-frame fastener consists, essentially, of a suitably formed shell or casing comprising a top 7 formed at one end with an upwardly projecting portion 8 having a suitably shaped opening, as 9. Projecting downwardly from the said top 7 are the longitudinally extending side-walls 10 and the laterally extending end-walls 11, the said end-walls being provided with suitably shaped extensions or ears 12. Conforming to the general contour of the said side-walls 10 and the said extensions or ears 12 is a closing base-plate 13, provided with holes or perforations 14 which correspond to suitable holes or perforations 15 with which the said ears or extensions 12 are provided, for the reception of fastening rivets 16, by means of which the shell or casing and the base-plate of the fastener are secured to the frame-section 1, as will be clearly understood from an inspection of Figures 1, 2 and 3 of the drawings. The opposite sides of the previously mentioned upwardly projecting portion 8 are provided with perforations 17 in which are mounted the end-portions of a pin 18, said pin extending laterally across the opening 9, substantially as indicated in Figures 3, 6, 7 and 9, of the drawings.

Referring now more particularly to Figures 4 to 8 inclusive, it will be seen, that there is secured to the inner surface of the top 7 of the fastener-shell or casing, by means of rivets 20, or other suitable fastening means, a spring-plate, comprising a pair of arms 21, which are suitably perforated, as at 23, for the reception of said rivets 2, and for the proper fastening of the said spring-plate within the chamber of said shell or casing, said arms 21 extending slightly downwardly, as shown, and terminating in a freely movable connecting end-member, as 22, thereby providing a substantially U-shaped or bifurcated spring-plate, of the general configuration, shown more particularly in Figures 10 and 11 of the drawings. Pivotally mounted upon the previously mentioned pin 18, by means of perforated pivot-lugs or ears 24, is a cover-plate 23, the end-portion of said plate, provided with said pivot-lugs or ears 24, extending into and through the opening 9 with which the upwardly projecting portion 8 of the fastener-shell or casing is provided, and the said lugs or ears 24 having a marginal cam-portion or engaging lug, as 25, in active engagement with the end-member 22 of the above-mentioned U-shaped or bifurcated spring-plate, as the said plate is lowered or raised, as clearly shown in Figures 6 and 7 of the drawings. The said cover-plate is provided at its other end-portion with a suitably shaped fingerpiece, as 26, for manipulation of said plate, and that its outer surface portions, when the said cover-plate is closed, may lie in the same horizontal plane as that of the upper surface-portion of the projection 8, the said cover-plate is preferably provided upon its under surface-portion with suitably disposed ribs, as 27. Movably disposed within the chamber of the fastener-shell or casing is a hasp-engaging latch-plate or slide comprising a main body-portion 28, formed with an elongated slot or opening 29 into which the previously-mentioned stop-pin or stud 19 of the base-plate 13 projects, so as to limit the movement of said latch-plate or slide longitudinally in either direction within the fastener-shell or casing. As will be seen more particularly from an inspection of Figures 12 and 13, at one of its edges the said latch-plate or slide is provided with an upwardly projecting marginal flange or rib, as 30, and at its oppositely located edge-portion, the said main body-portion 28 has a chamfered extension 31, and an upwardly and forwardly extending finger 32.

Projecting laterally from the marginal edge of the said latch-plate or slide, at a point between the said flange or rib 30 and the finger 32 is a suitably formed catch-member, as 33, of the general configuration shown, and which is adapted to be engaged by the catch or hasp-member 6 of the hasp-plate 4, when the frame-sections 1 and 2 are brought into their closed relation.

When the several members of the mechanism within the fastener-shell or casing, have been assembled in said shell or casing, the latch-plate or slide, as will be evident, is movably disposed upon the upper surface of the base-plate 13, the stop-lug or pin 19 of said plate 13, as has been previously stated, extends into the elongated hole or opening 29 of the latch-plate or slide, and the upwardly and forwardly projecting finger 32 of said latch-plate or slide projects between the arms 21 of the U-shaped or bifurcated spring-plate, with its free end-portion resting upon the upper surface of the connecting end-member 22 thereof, and extending directly between the pivot-lugs or ears 24 of the cover-plate 23, when the latter is in its lowered position, as clearly indicated in Figures 6 and 8 of the drawings.

However, the purpose of extending said finger 32 above and over the connecting end-member 22 is that the edge 34 acts as a stop against which the end 35 of the cover-plate 23 is brought in a manner shown in Figure 7 of the drawings, so that the said plate 23 when raised will properly assume the position indicated in said Figure 7, and that its cam-shaped ears or lugs can not be moved out of operative engagement with the connecting end-member 22 of the U-shaped or bifurcated spring-plate. Normally, the said latch-plate or slide is maintained in its initial position against the stop-pin or lug 19, by a spring 36, arranged within the fastener-shell or casing, between one of its end-walls 11 and the flange or rib 30 of the said latch-plate or slide, said spring 36 being provided with an arm 37 which bears upon the inner surface of said end-wall 11, and being provided with another arm 38 which bears against the outer surface of said flange or rib 30, as will be clearly understood from an inspection of Figures 4 and 5 of the drawings.

Having in the foregoing described the general construction of a bag-frame fastener embodying the principles of the present invention, I will now briefly set forth its operation.

Suppose the two bag-frame sections are in their closed relation, the frame-section 2 having been moved into the frame-section 1. In that case, the forwardly extending member 5 of the hasp-plate 4 has entered the fastener-casing or shell, through an open portion, as 39, in one of the longitudinally extending sides or walls 10, the hasp or catch-member 6 of the hasp-plate 4 having been forced into its locked or holding engagement with the catch-member 33 of the latch-plate or slide within the shell or casing against the action of the spring-arms 37 and 38 of the spring 36. To separate or open the two frame-sections 1 and 2, the hinged cover-plate 23 is raised, its end-portion 35 moving against the edge 34 of the finger 32 of the latch-plate or slide, thereby moving the latter in a direction toward the said spring-arms 37 and 38 of the spring 36, so as to compress said spring-arms, as shown in Figure 5, and at the same time withdrawing the catch-member 33 from its holding or locked engagement with the hasp or catch-member 6, the movement of the latch-plate or slide being limited by the length of the slot or opening 29 and the stop-pin or stud 19 of the plate 13, as will be evident. After the said latch-plate or slide has moved the limited distance, the edge 34 of the finger 32, as has been herein-above stated, acts as a stop against any further rotating movement of the hinged cover-plate, so that the latter will remain in the position indicated in Figure 7 of the drawings. To close the two frame-sections 1 and 2, the cover-plate 23 is again lowered, the spring 36 again acting to force the said latch-plate or slide into its former position, for permitting the hasp or catch-member 6 to again enter into locked or holding engagement with the catch-member 33 of the said latch-plate or slide, as will be clearly evident from an inspection of the several figures of the drawings.

While I have described my present form of bag-frame fastener for use in connection with the frame-sections of an "English" bag-frame, the fastener is just as readily adapted for use with other styles of bag-frames, and especially with the bag-frame sections which are L-shaped in cross-section.

I am also fully aware, that changes may be made in the general arrangements and combinations of the several devices and parts, as well as in the details of the construction of the said parts, without departing from the scope of the present invention as set forth in the foregoing specification, and as defined in the clauses of the claims which are appended to the said specification. Hence, I do not limit my present invention to the exact arrangement and combinations of the various devices and parts as described in the said specification, nor do I confine myself to the exact details of the construction of the said parts, as illustrated in the accompanying drawings.

I claim:—

1. In combination with a pair of hinged bag-frame sections, a bag-frame fastener comprising a casing and a base-plate both mounted upon one of said frame-sections, said casing being provided in one of its side-walls with a hasp-catch receiving opening, a hinged cover-plate upon the upper surface of said casing, a spring-plate secured within said casing with a portion of which the cover-plate engages, a spring-controlled latch-plate movably disposed within said casing, a catch-member connected with said latch-plate, and means connected with said latch-plate with which a portion of said cover-plate is adapted to engage so as to move said latch-plate, and at the same time serving as a stop to limit the pivotal movement of said cover-plate.

2. In combination with a pair of hinged bag-frame sections, a bag-frame fastener comprising a casing and a base-plate both mounted upon one of said frame-sections, said casing being provided in one of its side-walls with a hasp-catch receiving opening, a hinged cover-plate upon the upper surface of said casing, a spring-plate secured within said casing with a portion of which the cover-plate engages, a spring-controlled latch-plate movably disposed within said casing, a catch-member connected with said latch-plate, means connected with said latch-plate with which a portion of said cover-plate is adapted to engage so as to move said latch-plate, and at the same time serving as a stop to limit the pivotal movement of said cover-plate, and means connected with said base-plate in engagement with said latch-plate for limiting the movement of the same.

3. In combination with a pair of hinged bag-frame sections, a bag-frame fastener comprising a casing and a base-plate both mounted upon one of said frame-sections, said casing being provided in one of its side-walls with a hasp-catch receiving opening, a hinged cover-plate upon the upper surface of said casing, a spring-plate secured within said casing with a portion of which the cover-plate engages, a spring-controlled latch-plate movably disposed within said casing, a catch-member connected with said latch-plate, means connected with said latch-plate with which a portion of said cover-plate is adapted to engage so as to move said latch-plate, and at the same time serving as a stop to limit the pivotal movement of said cover-plate, said latch-plate being provided with an elongated opening, and a stop-pin projecting from said base-plate, said stop-pin extending into the elongated opening of said latch-plate to limit the movement of the same.

4. In combination with a pair of hinged bag-frame sections, a bag-frame fastener comprising a casing and a base-plate both mounted upon one of said frame-sections, said casing being provided in one of its side-walls with a hasp-catch receiving opening, a cover-plate provided with cam-shaped pintle ears for pivotally securing said cover-plate to said casing, a spring-plate secured within said casing with a portion of which the cam-shaped pintle-ears of the cover-plate are in engagement, a spring-controlled latch-plate movably disposed within said casing, a catch-member connected with said latch-plate, and a finger extending forwardly from said latch-plate with the end-edge of which a portion of said cover-plate is adapted to engage so as to move said latch-plate, and at the same time serving as a stop to limit the pivotal movement of said cover-plate.

5. In combination with a pair of hinged bag-frame sections, a bag-frame fastener comprising a casing and a base-plate both mounted upon one of said frame-sections, said casing being provided in one of its side-walls with a hasp-catch receiving opening, a cover-plate provided with cam-shaped pintle ears for pivotally securing said cover-plate to said casing, a spring-plate secured within said casing with a portion of which the cam-shaped pintle-ears of the cover-plate are in engagement, a spring-controlled latch-plate movably disposed within said casing, a catch-member connected with said latch-plate, a finger extending forwardly from said latch-plate with the end-edge of which a portion of said cover-plate is adapted to engage so as to move said latch-plate, and at the same time serving as a stop to limit the pivotal movement of said cover-plate, and means connected with said base-plate in engagement with said latch-plate for limiting the movement of the same.

6. In combination with a pair of hinged bag-frame sections, a bag-frame fastener comprising a casing and a base-plate both mounted upon one of said frame-sections, said casing being provided in one of its side-walls with a hasp-catch receiving opening, a cover-plate provided with cam-shaped pintle ears for pivotally securing said cover-plate to said casing, a spring-plate secured within said casing with a portion of which the cam-shaped pintle-ears of the cover-plate are in engagement, a spring-controlled latch-plate movably disposed within said casing, a catch-member connected with said latch-plate, a finger extending forwardly from said latch-plate with the end-edge of which a portion of said cover-plate is adapted to engage so as to move said latch-plate, and at the same time serving as a stop to limit the pivotal movement of said cover-plate, said latch-plate being provided with an elongated opening, and a stop-pin projecting from said base-plate, said stop-pin extending into the elongated opening of said latch-plate to limit the movement of the same.

7. In combination with a pair of hinged bag-frame fasteners comprising a casing and a base-plate both mounted upon one of said frame-sections, said casing being provided in one of its side-walls with a hasp-catch receiving opening, a cover-plate provided with cam-shaped pintle-ears for pivotally securing said cover-plate to said casing, a spring-plate comprising a pair of arms and a connecting end-member, means for securing said arms within said casing, the cam-shaped pintle-ears of said cover-plate being in engagement with said connecting end-member of the spring-plate, a spring-controlled latch-plate movably disposed within said casing, a catch-member connected with said latch-plate, and a finger extending forwardly from said latch-plate and between the arms and over the connecting end-member of said spring-plate, and with the end-edge of which a portion of said cover-plate is adapted to engage so as to move said latch-plate, and at the same time serving as a stop to limit the pivotal movement of said cover-plate.

8. In combination with a pair of hinged bag-frame sections, a bag-frame fastener comprising a casing and a base-plate both mounted upon one of said frame-sections, said casing being provided in one of its side-walls with a hasp-catch receiving opening, a cover-plate provided with cam-shaped pintle-ears for pivotally securing said cover-plate to said casing, a spring-plate comprising a pair of arms and a connecting end-member, means for securing said arms within said casing, the cam-shaped pintle-ears of said cover-plate being in engagement with said connecting end-member of the spring plate, a spring-controlled latch-plate movably disposed within said casing, a catch-member connected with said latch-plate, a finger extending forwardly from said latch-plate and between the arms and over the connecting end-member of said spring-plate, and with the end-edge of which a portion of said cover-plate is adapted to engage so as to move said latch-plate, and at the same time serving as a stop to limit the pivotal movement of said cover-plate, and means connected with said base-plate in engagement with said latch-plate for limiting the movement of the same.

9. In combination with a pair of hinged bag-frame sections, a bag-frame fastener comprising a casing and a base-plate both mounted upon one of said frame-sections, said casing being provided in one of its side-walls with a hasp-catch receiving opening, a cover-plate provided with cam-shaped pintle-ears for pivotally securing said cover-plate to said casing, a spring-plate, comprising a pair of arms and a connecting end-member, means for securing said arms within said casing, the cam-shaped pintle-ears of said cover-plate being in engagement with said connecting end-member of the spring-plate, a spring-controlled latch-plate movably disposed within said casing, a catch-member connected with said latch-plate, a finger extending forwardly from said latch-plate and between the arms and over the connecting end-member of said spring-plate, and with the end-edge of which a portion of said cover-plate is adapted to engage so as to move said latch-plate, and at the same time serving as a stop to limit the pivotal movement of said cover-plate, said latch-plate being provided with an elongated opening, and a stop-pin projecting from said base-plate, said stop-pin extending into the elongated opening of said latch-plate to limit the movement of the same.

10. In combination with a pair of hinged bag-frame sections, a bag-frame fastener comprising a casing and a base-plate both mounted upon one of said frame-sections, said casing being provided in one of its side-walls with a hasp-catch receiving opening, an upwardly extending portion projecting from the top of said casing, said upwardly projecting portion being provided with an opening, a pintle connected with the sides of said upwardly projecting portion and extending laterally across the opening thereof, a cover-plate, cam-shaped pintle-ears connected with said cover-plate, said ears being pivotally mounted upon said pintle, a spring-plate within said casing with a portion of which said pintle-ears are in engagement, a spring-controlled latch-plate movably disposed within said casing, a catch-member connected with said latch-plate, and a finger extending forwardly from said latch-plate with the end-edge of which a portion of said cover-plate is adapted to engage so as to move said latch-plate, and at the same time serving as a stop to limit the pivotal movement of said cover-plate.

11. In combination with a pair of hinged bag-frame sections, a bag-frame fastener comprising a casing and a base-plate both mounted upon one of said frame-sections, said casing being provided in one of its side-walls with a hasp-catch receiving opening, an upwardly extending portion projecting from the top of said casing, said upwardly projecting portion being provided with an opening, a pintle connected with the sides of said upwardly projecting portion and extending laterally across the opening thereof, a cover-plate, cam-shaped pintle ears connected with said cover-plate, said ears being pivotally mounted upon said pintle, a spring-plate within said casing with a portion of which said pintle-ears are in engagement, a spring-controlled latch-plate movably disposed within said casing, a catch-member connected with said latch-plate, a finger extending forwardly from said latch-plate with the end-edge of which a portion of said cover-plate is adapted to engage so as to move said latch-plate, and at the same time serving as a stop to limit the pivotal movement of said cover-plate, and means connected with said base-plate in engagement with said latch-plate for limiting the movement of the same.

12. In combination with a pair of hinged bag-frame sections, a bag-frame fastener comprising a casing and a base-plate both mounted upon one of said frame-sections, said casing being provided in one of its side-walls with a hasp-catch receiving opening, an upwardly extending portion projecting from the top of said casing, said upwardly projecting portion being provided with an opening, a pintle connected with the sides of said upwardly projecting portion and extending laterally across the opening thereof, a cover-plate, cam-shaped pintle-ears connected with said cover-plate, said ears being pivotally mounted upon said pintle, a spring-plate within said casing with a portion of which said pintle-ears are in engagement, a spring-controlled latch-plate movably disposed within said casing, a catch-member connected with said latch-plate, a finger extending forwardly from said latch-plate with the end-edge of which a portion of said cover-plate is adapted to engage so as to move said latch-plate, and at the same time serving as a stop to limit the pivotal movement of said cover-plate, said latch-plate being provided with an elongated opening, and a stop-pin projecting from said base-plate, said stop-pin extending into the elongated opening of said latch-plate to limit the movement of the same.

13. In combination with a pair of hinged bag-frame sections, a bag-framed fastener comprising a casing and a base-plate both mounted upon one of said frame-sections, said casing being provided in one of its side-walls with a hasp-catch receiving opening, an upwardly extending portion projecting from the top of said casing, said upwardly projecting portion being provided with an opening, a pintle connected with the sides of said upwardly projecting portion and extending laterally across the opening thereof, a cover-plate, cam-shaped pintle-ears connected with said cover-plate, said ears being pivotally mounted upon said pintle, a spring-plate comprising a pair of arms and a connecting end-member, means for securing said arms within said casing, the cam-shaped pintle-ears of said cover-plate being in engagement with said connecting end-member of the spring-plate, a spring-controlled latch-plate movably disposed within said casing, a catch-member connected with said latch-plate, a finger extending forwardly from said latch-plate and between the arms and over the connecting end-member of said spring-plate, and with the end-edge of which a portion of said cover-plate is adapted to engage so as to move said latch-plate, and at the same time serving as a stop to limit the pivotal movement of said cover-plate.

14. In combination with a pair of hinged bag-frame sections, a bag-frame fastener comprising a casing and a base-plate both mounted upon one of said frame-sections, said casing being provided in one of its side-walls with a hasp-catch receiving opening, an upwardly extending portion projecting from the top of said casing, said upwardly projecting portion being provided with an opening, a pintle connected with the sides of said upwardly projecting portion and extending laterally across the opening thereof, a cover-plate, cam-shaped pintle-ears connected with said cover-plate, said ears being pivotally mounted upon said pintle, a spring-plate comprising a pair of arms and a connecting end-member, means for securing said arms within said casing, the cam-shaped pintle-ears of said cover-plate being in engagement with said connecting end-member of the spring-plate, a spring-controlled latch-plate movably disposed within said casing, a catch-member connected with said latch-plate, a finger extending forwardly from said latch-plate and between the arms and over the connecting end-member of said spring-plate, and with the end-edge of which a portion of said cover-plate is adapted to engage so as to move said latch-plate, and at the same time serving as a stop to limit the pivotal movement of said cover-plate, and means connected with said base-plate in engagement with said latch-plate for limiting the movement of the same.

15. In combination with a pair of hinged bag-frame sections, a bag-frame fastener comprising a casing and a base-plate both mounted upon one of said frame-sections, said casing being provided in one of its side-walls with a hasp-catch receiving opening, an upwardly extending portion projecting from the top of said casing, said upwardly projecting portion being provided with an opening, a pintle connected with the sides of said upwardly projecting portion and extending laterally across the opening thereof, a cover-plate, cam-shaped pintle-ears connected with said cover-plate, said ears being pivotally mounted upon said pintle, a spring-plate comprising a pair of arms and a connecting end-member, means for securing said arms within said casing, the cam-shaped pintle-ears of said cover-plate being in engagement with said connecting end-member of the spring-plate, a spring-controlled latch-plate movably disposed within said casing, a catch-member connected with said latch-plate, a finger extending forwardly from said latch-plate and between the arms and over the connecting end-member of said spring-plate and with the end-edge of which a portion of said cover-plate is adapted to engage so as to move said latch-plate, and at the same time serving as a stop to limit the pivotal movement of said cover-plate, said latch-plate being provided with an elongated opening, and a stop-pin projecting from said base-plate, said stop-pin extending into the elongated opening of said latch-plate to limit the movement of the same.

In testimony that I claim the invention set forth above I have hereunto set my hand this 26th day of July, 1921.

HUGO TUECKMANTEL.

Witnesses:
FRED'K C. FRAENTZEL,
DORA WALZ.